No. 794,111. PATENTED JULY 4, 1905.
C. S. McGOWAN & H. F. PIPER.
TILTING TRUCK.
APPLICATION FILED AUG. 16, 1904.
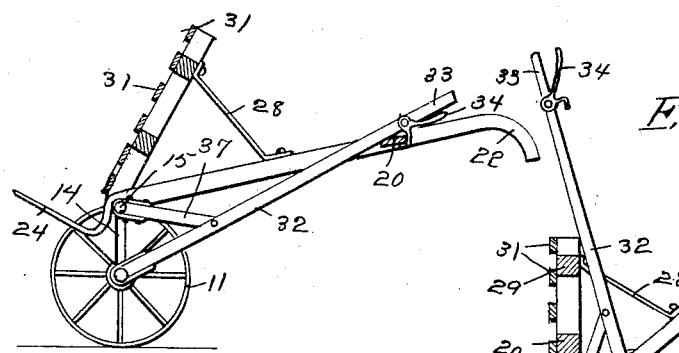
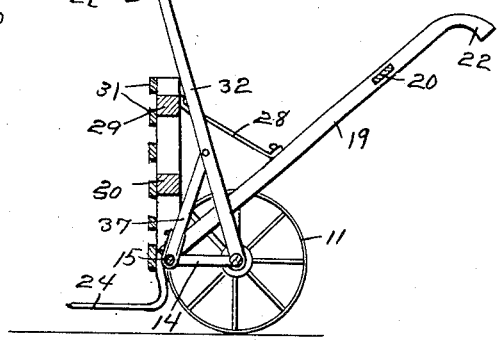
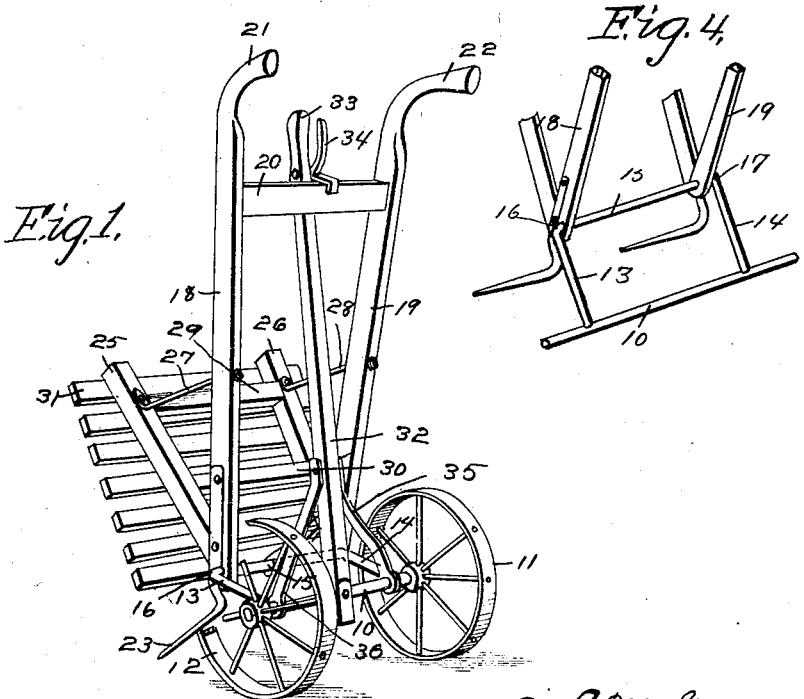
Witnesses
A. G. Hague
S. F. Christy
Inventors. C. S. McGowan
Henry F. Piper
By Owrig & Lane Attys No. 794,111. Patented July 4, 1905.

UNITED STATES PATENT OFFICE.

CHARLES S. McGOWAN AND HENRY F. PIPER, OF MELBOURNE, IOWA, ASSIGNORS OF ONE-FOURTH TO LAFAYETTE H. PEARSON AND ONE-FOURTH TO ALANSON D. MOREHOUSE, OF MELBOURNE, IOWA.

TILTING TRUCK.

SPECIFICATION forming part of Letters Patent No. 794,111, dated July 4, 1905.

Application filed August 16, 1904. Serial No. 220,985.

*To all whom it may concern:*

Be it known that we, CHARLES S. McGOWAN and HENRY F. PIPER, citizens of the United States, residing at Melbourne, in the county of Marshall and State of Iowa, have invented a certain new and useful Tilting Truck, of which the following is a specification.

The objects of our invention are to provide trucks of simple, durable, and inexpensive construction which are adapted to move from place to place articles of considerable weight and so constructed that when in one position the articles to be carried can be easily loaded upon the platform of the truck and then to enable the operator to swing the platform, with its load, to a position where the weight carried will be immediately above the axle of the truck, so that there will be little, if any, weight upon the handles of the truck, thus enabling the operator to more easily move the load from one place to another.

Our device is particularly adapted for use in brick-yards, but can be used as a truck for moving any heavy body, the result accomplished being the same whether moving bricks or other heavy articles.

Our invention consists in certain details in the construction, arrangement, and combination of the various parts of the device whereby the objects contemplated are attained, as hereinafter more fully set forth, pointed out in our claims, and illustrated in the accompanying drawings, in which—

Figure 1 shows in perspective our device with the handles at their upper forward limit of movement. Fig. 2 is a longitudinal sectional view of the device with the carrier-platform in position, where it stands when the truck is moved from one place to another. Fig. 3 is a sectional view of the truck, showing the platform in position for loading and the lever for elevating the platform in engagement with it; and Fig. 4 is a detail view of the shaft which is connected with the axle and upon which the carrier-platform is mounted.

Referring to the accompanying drawings, we have used the reference-numeral 10 to indicate the axle of our device, having the wheels 11 and 12 at the ends thereof. Firmly attached to the axle and extending away from it are the shaft-supports 13 and 14, which are connected at their outer ends by the shaft 15, which is substantially parallel with the axle 10. The shaft-supports 13 and 14 and the shaft 15 are preferably made of a single piece of shafting material which is bent at the corners 16 and 17, so that the supports 13 and and 14 can be attached to the axle 10. Pivotally mounted at the ends of the shaft 15 are the handles 18 and 19, which are connected by the brace 20 near their handle portions 21 and 22. Attached to the handle 18 and extending first downwardly and then outwardly therefrom is a supporting-prong 23. Extending first downwardly and then outwardly from the handle 19 is the supporting-prong 24. The outwardly-extending portions of these prongs are substantially parallel with each other, so that when the article to be carried is placed upon the prongs it will be held firmly in position relative to the platform, hereinafter described. Attached to the lower forward portion of the handles 18 and 19 and extending outwardly from said handles are the platform-supports 25 and 26, the free ends of which are maintained in position away from the handles 18 and 19 by the brace-rods 27 and 28, respectively. The brace-rods are between the supports 25 and 26 and the handles 18 and 19. Connecting the platform-supports 25 and 26 are the braces 29 and 30, so arranged that the support or platform will be rigid and rigidly secured to the handles 18 and 19. A series of slats 31 are firmly attached to the outer surface of the supports 25 and 26 and extend across said supports.

By the above description it will be seen that the platform, which is formed by the slats 31, the supports 25 and 26, and the various braces, and also the supporting-prongs 23 and 24, are firmly secured to the handles and that the handles are pivotally attached to the shaft 15, so that whenever the handles are swung upon the shaft 15 the platform and supporting-prongs will be swung at the same time.

Pivotally mounted on the axle 10 is the operating-lever 32, which operating-lever extends outwardly from the axle between the platform and the brace 20 and has a handle 33 at its upper end. We have provided a locking-lever 34, which is pivotally attached to the lever 32 and adjacent to the handle 33 and so arranged that this locking-lever can be thrown into or out of engagement with the brace 20 by the same hand that operates the lever 32 when said lever is in engagement with the brace 20. Pivotally mounted on the axle 10 are the braces 35 and 36, which are secured at their outer ends rigidly to the lever 32. Pivotally attached to the central portion of the shaft 15 at one end and pivotally attached at its other end to the lever 32 is the link 37, which is designed to coact with the lever 32 in swinging the shaft 15 and the platform, which is attached to it, from the position shown in Fig. 3 to the position shown in Fig. 2, and vice versa—that is, the shaft 15 and the platform, which is mounted upon it, are swung from a position in front of the axle 10 to a position above it—that is, the load which is placed upon the platform is swung by the lever 32 from the position most favorable for loading to a position most favorable for being transmitted by the truck.

In practical use the bricks are piled on a board or "leg-pallet" sufficiently raised from the floor to permit the prongs of the truck to be inserted under it. As the board or pallet is loaded the truck is moved toward it and the prongs are slipped beneath it until the load of bricks rests against the slats 31 of the platform. When the load of bricks is in this position, the operator grasps the portion 21 of the handles and holds these handles rigidly in position. He then grasps with his other hand the handle 33 of the lever 32 and swings the platform by this lever from the position shown in Fig. 3 to the position shown in Fig. 2, and he then locks the lever in this position and in engagement with the brace 20 by means of the locking-lever 34. The truck is then in condition for being moved from one place to another, and as the load mounted on the platform is immediately above the axle and rests at a dead-center in that position the operator simply has to move the load by pushing the truck and in doing this does not have to support the load, but simply guides it as he moves the truck from one place to another. When the load has been moved to the desired position, the operator releases the locking-lever 34 and by the use of the lever 32 lowers the load to the ground and dumps it and draws his truck back for another load.

Having thus described our invention, what we claim, and desire to secure by Letters Patent of the United States therefor, is—

1. In a device of the class described, a wheel-bearing axle, a shaft connected to and substantially parallel with the axle, handles pivotally mounted on the shaft, a platform mounted on the handles, a lever pivotally mounted on the axle and connected with the shaft for swinging the platform from a position at one side of the axle to a position immediately above it.

2. In a device of the class described, a wheel-bearing axle, a shaft firmly connected with the axle and substantially parallel with it, handles pivotally mounted on said shaft and at the ends thereof, a platform mounted on said handles, supporting-prongs attached to the lower ends of said handles, a lever pivotally mounted on said axle and a link pivotally connecting said lever with said shaft.

3. In a device of the class described, a wheel-bearing axle, a shaft firmly connected with the axle and substantially parallel with it, handles pivotally mounted on said shaft and at the ends thereof, a platform mounted on said handles, supporting-prongs attached to the lower ends of said handles, a lever pivotally mounted on said axle, and a link pivotally connecting said lever with said shaft, and a locking-lever pivotally attached to the lever for maintaining it in position relative to the handles.

4. In a device of the class described, a wheel-bearing axle, a shaft firmly connected with the axle and substantially parallel with it, handles pivotally mounted on said shaft and at the ends thereof, a platform mounted on said handles, supporting-prongs attached to the lower ends of said handles, a lever pivotally mounted on said axle, a link pivotally connecting said lever with said shaft, and braces for supporting the locking-lever against longitudinal movement of the axle.

5. In a device of the class described, a wheel-bearing axle, a shaft firmly connected with the axle and substantially parallel with it, handles pivotally mounted on said shaft and at the ends thereof, a platform mounted on said handles, supporting-prongs attached to the lower ends of said handles, a lever pivotally mounted on said axle, a link pivotally connecting said lever with said shaft, braces for supporting the lever against longitudinal movement of the axle, and a locking-lever pivotally attached to the lever for maintaining it in position relative to the handles.

6. In a truck, a wheel-bearing axle, a shaft connected with the axle and substantially parallel with it, handles pivotally mounted on the shaft, a brace connecting the handles, a platform at one side attached to the lower ends of the handles and having its other side a considerable distance away from the handles and secured thereto by braces, supporting-prongs attached to the lower ends of said handles, a lever pivotally mounted on the axle, a link for pivotally connecting the shaft and the lever for swinging the platform relative to the axle.

7. In a truck, a wheel-bearing axle, a shaft connected with the axle and substantially parallel with it, handles pivotally mounted on the shaft, a brace connecting the handles, a platform at one side attached to the lower ends of the handles and having its other side a considerable distance away from the handles and secured thereto by braces, supporting-prongs attached to the lower ends of said handles, a lever pivotally mounted on the axle, a link for pivotally connecting the shaft and the lever for swinging the platform relative to the axle, and a locking-lever pivotally attached to the lever and designed to coact with the brace between the handles in supporting the platform in position relative to the handles.

8. In a truck, an axle, wheels mounted at each end of the axle, a substantially U-shaped shaft connected with the axle, handles mounted on the shaft, a platform secured to the handles, a lever pivotally mounted on the axle and connected with the shaft for swinging the platform from a position at one side of the axle to a position immediately above it.

9. In a truck, an axle, wheels mounted at each end of the axle, a substantially U-shaped shaft connected with the axle, handles mounted on the shaft, a platform secured to the handles, a lever pivotally mounted on the axle and connected with the shaft for swinging the platform from a position at one side of the axle to a position immediately above it, and means for securing the lever and the handles in position relative to each other.

CHARLES S. McGOWAN.
HENRY F. PIPER.

Witnesses:
C. S. WOOD,
FAY B. BURCH.